United States Patent
Rettinger et al.

(10) Patent No.: US 10,890,215 B2
(45) Date of Patent: Jan. 12, 2021

(54) SEALED ROLLER BEARING

(71) Applicant: Schaeffler Technologies AG & Co. KG, Herzogenaurach (DE)

(72) Inventors: Manuel Rettinger, Oerlenbach (DE); Jörg Neukirchner, Euerbach (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 16/481,654

(22) PCT Filed: Mar. 2, 2018

(86) PCT No.: PCT/DE2018/100188
§ 371 (c)(1),
(2) Date: Jul. 29, 2019

(87) PCT Pub. No.: WO2018/177459
PCT Pub. Date: Oct. 4, 2018

(65) Prior Publication Data
US 2020/0025252 A1 Jan. 23, 2020

(30) Foreign Application Priority Data
Mar. 31, 2017 (DE) .................. 10 2017 107 005

(51) Int. Cl.
*F16C 33/58* (2006.01)
*F16C 33/66* (2006.01)
(Continued)

(52) U.S. Cl.
CPC .......... *F16C 33/586* (2013.01); *F16C 19/386* (2013.01); *F16C 33/6607* (2013.01);
(Continued)

(58) Field of Classification Search
CPC .............. F16C 33/6607; F16C 33/7889; F16C 33/6685; F16C 33/7886; F16C 19/386;
(Continued)

(56) References Cited

U.S. PATENT DOCUMENTS

| 4,043,620 | A | | 8/1977 | Otto |
|---|---|---|---|---|
| 4,544,168 | A | | 10/1985 | Ruediger |
| 5,135,236 | A | * | 8/1992 | Kruk ................... F16C 33/7813 277/572 |
| 2010/0308594 | A1 | | 12/2010 | Numajiri |

(Continued)

FOREIGN PATENT DOCUMENTS

| CN | 1095800 A | 11/1994 |
|---|---|---|
| CN | 101868558 A | 10/2010 |

(Continued)

OTHER PUBLICATIONS

Machine Translation of DE 102010051424 (Year: 2012).*

*Primary Examiner* — Alan B Waits
(74) *Attorney, Agent, or Firm* — Kevin Parks

(57) ABSTRACT

A roller bearing for a wind turbine includes a first inner ring with an axial protrusion, a second inner ring, an outer ring arranged coaxially over the first inner ring and the second inner ring, and first and second pluralities of rolling elements. The rolling elements roll on respective inner ring and outer ring raceways. The roller bearing also has a bearing interior at least partially filled with a lubricant, an additional ring arranged radially outwardly on the axial protrusion, an axial extension connected to the outer ring and includes a cylindrical inner sealing face, and a radial shaft sealing ring installed on the additional ring in a radially outward manner. The radial shaft sealing ring has a radially outwardly directed sealing lip in radial contact with the cylindrical inner sealing face.

18 Claims, 1 Drawing Sheet

(51) Int. Cl.
*F16C 33/78* (2006.01)
*F16J 15/32* (2016.01)
*F16C 19/38* (2006.01)
*F16J 15/3268* (2016.01)
*F16C 33/60* (2006.01)
*F16J 15/3212* (2016.01)

(52) U.S. Cl.
CPC ....... *F16C 33/7889* (2013.01); *F16J 15/3268* (2013.01); *F16C 33/585* (2013.01); *F16C 33/605* (2013.01); *F16C 33/6622* (2013.01); *F16C 33/7813* (2013.01); *F16C 2300/14* (2013.01); *F16C 2360/31* (2013.01); *F16J 15/3212* (2013.01)

(58) Field of Classification Search
CPC .. F16C 2360/31; F16C 33/586; F16C 33/585; F16C 33/605; F16C 33/7813; F16C 33/6622; F16C 2300/14; F16J 15/3268; F16J 15/3212; F16J 15/3216; F16J 15/3224

See application file for complete search history.

(56) References Cited

U.S. PATENT DOCUMENTS

2013/0017089 A1* 1/2013 Stiesdal .................. F16C 33/60
416/174
2016/0108966 A1* 4/2016 Krebs ................. F16C 33/7813
384/480

FOREIGN PATENT DOCUMENTS

| CN | 104232875 A | | 12/2014 |
|---|---|---|---|
| DE | 102009014923 A1 | | 9/2010 |
| DE | 102010051424 | * | 5/2012 |
| DE | 102012212792 A1 | | 1/2014 |
| DE | 102013208203 A1 | | 11/2014 |
| DE | 102013225333 A1 | | 6/2015 |
| DE | 112015001129 T5 | | 11/2016 |
| EP | 2669541 | * | 12/2013 |
| JP | 2009203526 A | | 9/2009 |
| JP | 2012197871 A | | 10/2012 |
| WO | 2012128054 A1 | | 9/2012 |
| WO | WO 2012135254 | * | 10/2012 |

* cited by examiner

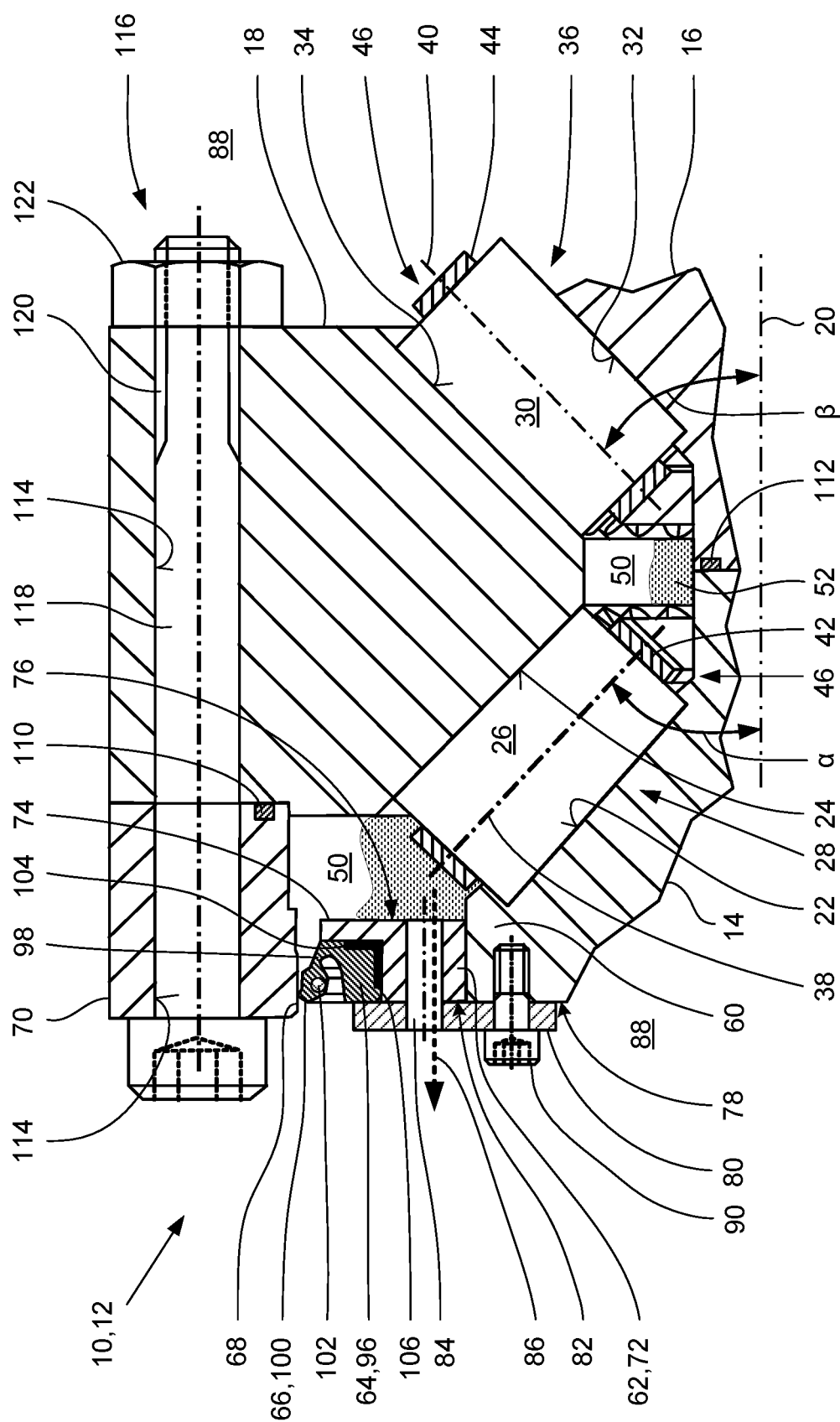

SEALED ROLLER BEARING

CROSS-REFERENCE TO RELATED APPLICATIONS

This application is the United States National Phase of PCT Appln. No. PCT/DE2018/100188 filed Mar. 2, 2018, which claims priority to German Application No. DE102017107005.2 filed Mar. 31, 2017, the entire disclosures of which are incorporated by reference herein.

TECHNICAL FIELD

The disclosure relates to a sealed rolling bearing which is in the form of a two-rowed tapered roller bearing and ca be used for example as a rotor shaft bearing of a wind turbine. This rolling bearing includes a first inner ring, a second inner ring and an outer ring which is arranged coaxially over these two inner rings. Rolling elements are arranged in two rolling-element rows radially between the two inner rings and the outer ring. The rolling elements of the first rolling-element row roll on a first inner ring raceway and a first outer ring raceway, and the rolling elements of the second rolling-element row roll on a second inner ring raceway and a second outer ring raceway. The rolling elements being arranged in at least one rolling-element cage, and a bearing interior is filled at least in part with a lubricant.

BACKGROUND

Rolling bearings are used in a known manner for mounting rotatable machine elements with low friction. In the field of wind turbines, large rolling bearings are used inter alia to mount the rotor shaft. For the cost-effective production of large rolling bearings of this type, newer production technologies, such as inductive hardening, can be used. However, the inductive hardening requires the faces to be hardened to have a simple geometric design, which is not always the case in current designs of large rolling bearings.

In the case of known large rolling bearings, in the region of radial shaft sealing rings which are obstructed to seal the bearing interior, occasional leakages can occur. One reason for this is that lubricant or bearing grease is displaced by the moving rolling elements. As a result of a pulsating displacement effect, the bearing grease is thrown against the sealing lip of the radial shaft sealing ring, and therefore high local pressure peaks occur on the sealing lip, which the sealing lip of the radial shaft sealing ring cannot withstand long term.

SUMMARY

Accordingly, the disclosure starts from a sealed rolling bearing which is in the form of a two-rowed tapered roller bearing and can be used for example as a large main bearing for the rotor shaft of a wind turbine. This rolling bearing has a first inner ring, a second inner ring and an outer ring which is arranged coaxially over these two inner rings Rolling elements are arranged in two rolling-element rows radially between the two inner rings and the outer ring. The rolling elements of the first rolling-element row roll on a first inner ring raceway and a first outer ring raceway, and the rolling elements of the second rolling-element row roll on a second inner ring raceway and a second outer ring raceway. The rolling elements are arranged in at least one rolling-element cage, and a bearing interior is filled at least in part with a lubricant.

The rolling bearing includes an additional ring arranged radially outwardly on an axial protrusion of the first inner ring. The additional ring bears a radial shaft sealing ring in a radially outward manner. A radially outwardly directed sealing lip of the radial shaft sealing ring is in radial contact with a cylindrical inner sealing face of an axial extension which is connected to the outer ring.

By means of this construction, a relatively large distance is provided between the radial shaft sealing ring and the rolling elements of the rolling bearing, and therefore the pressure load of the sealing ring of the radial shaft sealing ring by hydraulic displacement effects of the lubricant as a result of the rolling element rolling is relatively low, and a tendency towards leakages in this region is reduced.

As a result of the additional ring, which is in the form of a separate component, the two-part inner ring has a relatively simple geometry, which simplifies the production thereof. Thus, in the case of the cutting production steps during the manufacture of the inner ring, less waste occurs, and inductive hardening processes can easily be carried out on the faces having simple geometries. In addition, the proportion by volume of higher-quality rolling bearing steel required for the manufacture of a rolling bearing of this type is reduced in a cost-saving manner.

According to one embodiment, it is provided that the additional ring comprises a base body having a substantially rectangular cross-sectional geometry, and that a radially outwardly directed flange is formed on the base body, which flange finishes flush with an axially inwardly oriented first end face of the base body of the additional ring. As a result, the radial shaft sealing ring is secured in position on the additional ring against an axially inwardly occurring displacement movement.

In the case of another development of this rolling bearing, it is provided that a closure disk is attached to an end-face outer face of the first inner ring, and that the closure disk finishes flush with an axially outwardly directed second end face of the base body of the additional ring. As a result, the radial shaft sealing ring is also attached to the first inner ring so as to be secured in position in the second axial direction, that is to say axially outwardly.

The closure disk may have a segmented design, and this facilitates the mounting thereof. In addition, the closure disk can have a circumferentially segmented design in such a way that said disk consists only of circular disk segments. Such points on the inner ring or on the additional ring at which the through-holes for the emission of lubricant are located can be free of circular disk segments of this type.

At least one axial through-hole may be formed in the mentioned additional ring and in the mentioned closure disk. As a result, old lubricant can then issue from the bearing interior of the rolling bearing into the surroundings in a controlled manner when new lubricant is introduced into the bearing interior, for example by means of a grease gun for maintenance purposes, and the old lubricant is displaced by the new lubricant. The closure disk can be connected to the additional ring for example by integral bonding, a magnetic connection, a screw connection or the like.

According to one embodiment, it is provided that the additional ring is attached to the axial protrusion of the first inner ring by shrinking. As a result, a reliable attachment of the additional ring to the first inner ring, which does not release under practically any circumstances in normal operation, is provided.

Instead of a shrink fit of this type and shrinking the additional ring onto the axial protrusion of the corresponding inner ring, to axially secure the additional ring, it can be provided that the closure ring is screwed both to the corresponding inner ring and to the additional ring. A reliable connection of the additional ring to the first inner ring is also achieved thereby. This construction can be sealed by means of at least one O-ring which is arranged radially between the corresponding inner ring and the additional ring.

According to another embodiment, it is provided that the radial shaft sealing ring includes an annular main body having a web which is movable in the radial direction, and that the web transitions into a peripheral edge portion forming a sealing lip, in which portion an annular or meandering tensioning element is received. As a result, a further optimized sealing effect with respect to the lubricant is provided. By the tensioning element, which is for example in the form of a peripheral tubular spring, the edge portion of the main body of the radial shaft sealing ring is additionally radially stressed outwards against the hardened, for example, inner sealing face of the axial extension of the outer ring by the spring tension of the tensioning element, as a result of which a sealing effect which is substantially independent of the degree of wear of the first sealing lip is achieved.

Another embodiment of the rolling bearing provides that the main body of the radial shaft sealing ring is received on an outer circumferential surface of the additional ring and is axially clamped between the closure disk and the flange of the additional ring. As a result of this, the radial shaft sealing ring is radially fixed in position on the additional ring. Furthermore, the axial bracing of the main body of the radial shaft sealing ring results in at least a minor but advantageous radial expansion thereof towards the inner sealing face of the axial extension of the outer ring.

Furthermore, the main body, the web and the edge portion may be produced integrally with the sealing lip of the radial shaft sealing ring using a resilient plastics material. The depicted material combination with the non-elastomeric components of the radial shaft sealing ring results in an excellent sealing effect which is associated with a long, maintenance-free service life of the radial shaft sealing ring.

Furthermore, in the case of a rolling bearing according to the disclosure, it can be provided that a sealing element is arranged between the axial extension and the outer ring. Moreover, an additional sealing element is provided between the two axially abutting inner rings of the sealed rolling bearing. The sealing element can be formed for example as an O-ring or as an annular sealing element having a rectangular cross-sectional geometry.

To connect the outer ring to the axial extension, these are permeated by at least one continuous axial fixing hole for connection thereof by means of a suitable screw connection. These can comprise for example a cylinder screw and a threaded nut which can be screwed onto said screw. As a result of this, a simple and simultaneously robust arrangement of the radial shaft sealing ring on the outer ring of the sealed large rolling bearing is provided by the laterally attached axial extension.

BRIEF DESCRIPTION OF THE DRAWINGS

The disclosure will be explained further in the following on the basis of one exemplary embodiment. For this purpose, a drawing is appended to the description, the single FIGURE of which is a schematic partial longitudinal section through a large rolling bearing having the features of the disclosure.

DETAILED DESCRIPTION

The sealed large rolling bearing 10 shown in the FIGURE is in the form of a two-row tapered roller bearing 12 for a wind turbine or the like. The bearing includes a first inner ring 14 and a second inner ring 16 which are arranged axially close together and are coaxially and radially outwardly surrounded by an integral outer ring 18. The two inner rings 14, 16 and the outer ring 18 are formed and arranged rotationally symmetrically to a longitudinal centerline 20. Rolling elements 26, 30 are arranged in two rolling-element rows 28, 36 radially between the two inner rings 14, 16 and the outer ring 18, which rolling elements are guided by in each case one rolling-element cage 42, 44.

The rolling elements 26 of the first rolling-element row 28 roll on a first inner ring raceway 22 and a first outer ring raceway 24, while the rolling elements 30 of the second rolling-element row 36 roll on a second inner ring raceway 32 and a second outer ring raceway 34. If necessary, inter alia to simplify the production, the mounting and the maintenance in a target application, both the outer ring 18 and the two inner rings 14, 16 can have a segmented design for example in the circumferential direction.

Axially on each side of the two inner ring raceways 22, 32, in each case one guide edge (not labeled) for axially guiding the rolling elements 26, 30 is formed integrally on the respective inner rings 14, 16. By contrast, the two outer ring raceways 24, 34 are formed without edges.

At least the two inner rings 14, 16 and the outer ring 18 are produced from a high-quality rolling bearing steel. The two inner ring raceways 22, 32 and the two outer ring raceways 24, 34 are formed, including the two guide edges, so as to be hardened on the inner ring raceways 22, 32. As a result of the simple surface geometry of the inner rings 14, 16 and the outer ring 18 provided here, the hardening process may be induction hardening.

The rolling elements 26, 30 may each have a frustoconical design, the axes of rotation 38 of the rolling elements 26 of the first rolling element row 28 each being arranged so as to be inclined at a first angle $\alpha$ of approximately 45° with respect to the longitudinal centerline 20. Accordingly, the axis of rotation 40 of the rolling elements 30 of the second rolling element row 36 is arranged in opposition to the first angle $\alpha$ so as to be inclined by a second angle $\beta$ with respect to the longitudinal centerline 20. The second angle $\beta$ is, for example, approximately the same as the first angle $\alpha$. As a result of the rolling element rows 28, 36 lined up in opposition to one another at the angles $\alpha$, $\beta$, the tapered roller bearing 12 is able to receive both radial forces and also axial forces, such as occur in systems for mounting rotor shafts in wind turbines or the like.

The rolling elements 26 of the first rolling element row 28 and the rolling elements 30 of the second rolling element row 36 are each guided in the first rolling-element cage 42 and in the second rolling-element cage 44 respectively at least circumferentially at a distance from one another. These two rolling-element cages 42, 44 may have a segmented design to facilitate the mounting thereof in the case of large dimensions. The two rolling-element cages 42, 44 can be interconnected or arranged so as to be circumferentially rotatable independently of one another, and together, said cages embody a rolling-element-cage system 46 according to the definition selected here. To minimize the bearing friction, to reduce noise and to prevent the penetration of foreign particles into the bearing interior 50, the bearing interior 50 is filled at least in part with a lubricant 52. The lubricant 52 is may be a highly viscous and substantially non-compressible bearing grease.

According to the disclosure, a solid, approximately hollow cylindrical additional ring 62 is attached to an axial protrusion 60 of the first inner ring 14. For this purpose, the axial protrusion 60 protrudes radially and axially outwards slightly from the first inner ring 14 and is integrally formed thereon. The additional ring 62 radially outwardly supports a radial shaft sealing ring 64, the radially outwardly directed sealing lip 66 of which is in contact with a cylindrical inner sealing face 68 of an axial extension 70 which is connected to the outer ring 14. This cylindrical inner sealing face 68 of the axial extension 70 of the outer ring 14 has a hardened form.

The base body 72 of the additional ring 62 has an approximately polygonal cross-sectional geometry. A radially outwardly pointing flange 74 is further integrally formed on the base body 72, which flange finishes axially flush with the axially inwardly pointing first end face 76 of the base body 72. In this case, the flange 74 on the base body 72 has a rectangular cross-sectional geometry merely by way of example.

By contrast with known technical solutions, the distance between the rolling elements 26 of the first rolling element row 28 and the radial shaft sealing ring 64 is increased by the additional ring 62. Consequently, the amplitude of the pressure surges in the lubricant 52, which are brought about by the rolling elements 26, 30 as a result of the movement thereof inside the rolling bearing 10 or the tapered roller bearing 12 due to displacement effects, until the radial shaft sealing ring 64 is reached, is dampened so strongly that much fewer leakages occur in the region of the sealing lip 66 of the radial shaft sealing ring 64 than in the case of conventional rolling bearings of the same design.

The additional ring 62 and the axial extension 70 on the outer ring 18 are each produced as separate components, as a result of which, following cutting production processes, a surface treatment, in particular in the form of grinding, polishing, honing and lapping, and the hardening of the inner sealing face 68 of the axial extension 70 can take place independently of a surface treatment and/or a hardening process of the outer ring 18. The same applies to the additional ring 62 and the first inner ring 14. The preceding results in a simplification of the entire manufacturing process of the tapered roller bearing 12 and, as a consequence thereof, cost-saving potential.

On a first, approximately annular, end-face outer face 78 of the first inner ring 14, a substantially hollow cylindrical closure disk 80 is further attached in a flush manner to an axially outwardly directed second end face 82 of the base body 72 of the additional ring 62. At least one axial through-hole 84 is introduced into the base body 72 of the additional ring 62 and into the closure disk 80, the diameter of which hole has suitable dimensions. Through this through-hole 84, the lubricant 52, as indicated by the arrow 86, can reach the surroundings 88 outside the tapered roller bearing 12 from the bearing interior 50 in a controlled manner. This can occur for example when, for the purpose of maintenance of the tapered roller bearing 12 by means of a grease gun or a similar tool, new, unused lubricant 52 is pressed into the bearing interior 50 at high pressure and, as a consequence thereof, at least some of the old lubricant is displaced by the new lubricant 52.

The closure disk 80 is attached to the first inner ring 14 for example by at least one threaded bolt 90. Alternatively, the closure disk 80 can also be connected to the first inner ring 14 by a magnetic connection or adhesive bond.

The additional ring 62 may be thermally shrunk onto the axial protrusion 60 of the first inner ring 14, as a result of which, under practically all operating conditions of the tapered roller bearing 12 which occur, a particularly reliable connection can be produced, which additionally manages without additional connecting elements or fasteners. In addition, a complex surface treatment, which is to be provided otherwise, of the axial protrusion 60 of the first inner ring 14 in the region of the additional ring 62 to be attached is unnecessary.

The radial shaft sealing ring 64 has an annular main body 96 having an approximately rectangular cross-sectional geometry. On the main body 96 of the radial shaft sealing ring 64, a thin, radially outwardly directed, movable web 98 is integrally formed, which in turn transitions into a circumferential edge portion 100 which forms the sealing lip 66. In the head-like, thickened and circular edge portion 100 of the radial shaft sealing ring 64, an annular tensioning element 102 is embedded, as a result of which the sealing lip 66 is radially stressed outwards towards the inner sealing face 68 of the axial extension 70 by a spring tension. Consequently, an excellent sealing effect of the radial shaft sealing ring 64, which is mostly independent of the current state of wear of the sealing lip 66, is ensured. In this case, the tensioning element 102 may be an annular tubular spring which is circumferentially revolving inside the edge portion 100 or the like.

The main body 96 of the radial shaft sealing ring 64 can further have an optional reinforcing profile 104 made of a metal or of an optionally fiber-reinforced plastics material having high flexural rigidity. In this case, it is possible to embed the reinforcing profile 104 in the main body 96 on all sides. Alternatively, the reinforcing profile 104 can be formed to finish flush in some regions with the surface portions of the main body 96 facing the additional ring 62. In this case, the reinforcing profile 104 is, merely by way of example, in the form of a rectangular angular profile having branches which are approximately the same length in each case.

The main body 96 of the radial shaft sealing ring 64 is received on a substantially cylindrical outer circumferential surface 106 of the additional ring 62 and may be axially clamped between the closure disk 80 and the radially outwardly directed flange 74 of the additional ring 62. As a result of the axial pretensioning of the main body 96 of the radial shaft sealing ring 64, the main body is expanded at least slightly in the radial direction as a result of the inherent resiliency thereof, as a result of which a further improvement of the sealing effect occurs due to a sealing lip 66 abutting with greater force.

The main body 96, the web 98 and the edge portion 100, together with the sealing lip 66 of the radial shaft sealing ring 64 which is molded thereon, are may be formed integrally from a resilient plastics material, in particular by an elastomer or the like. As elastomers, for example silicones, rubber or polyurethane are considered.

For the further completion of the sealing of the tapered roller bearing 12, a sealing element 110 is arranged between the axial extension 70 and the outer ring 18. In addition, a sealing element 112 is arranged between the two axially abutting inner rings 14, 16. The two above-mentioned sealing elements 110, 112 can be for example in the form of conventional O-rings, of annular flat seals having a rectangular cross-sectional geometry or the like.

The outer ring 16 and the axial extension 70 are permeated by at least one axially continuous, cylindrical fixing hole 114 for the mechanically rigid connection by means of a screw connection 116 indicated here only schematically. In this case, the screw connection 116 is produced for example by a threaded bolt 118 and a nut 122 which is screwed onto the end-face threaded portion 120 thereof. To ensure a reliable and mechanically sufficiently load-bearing connection between the outer ring 18 and the axial extension 70, a plurality of screw connections of this type may be provided at a uniform distance from one another over the circumference.

The rolling bearing 10 shown in the single FIGURE or the tapered roller bearing 12 can be formed on the side of the second inner ring 16 and equally in the region of the first inner ring 14. A second additional ring would then be attached to an axial protrusion of the second inner ring 14, which ring would support a second radial shaft sealing ring. This second radial shaft sealing ring would then have an identical design to the radial shaft sealing ring in the region of the first inner ring 12 and would be for example in sealing contact with a second axial extension of the outer ring 18.

REFERENCE NUMERALS 10 rolling bearing, large rolling bearing
12 tapered roller bearing
14 first inner ring
16 second inner ring
18 outer ring
20 longitudinal centerline
22 first inner ring raceway
24 first outer ring raceway
26 rolling element of the first rolling element row
28 first rolling element row
30 rolling element of the second rolling element row
32 second inner ring raceway
34 second outer ring raceway
36 second rolling element row
38 axis of rotation of the rolling element 26
40 axis of rotation of the rolling element 30
42 first rolling-element cage
44 second rolling-element cage
46 rolling-element-cage system
50 bearing interior
52 lubricant
60 axial protrusion on the first inner ring
62 additional ring
64 radial shaft sealing ring
66 sealing lip of the radial shaft sealing ring
68 inner sealing face
70 axial extension
72 base body of the additional ring
74 flange of the additional ring
76 first end face of the additional ring
78 outer face
80 closure disk
82 second end face of the additional ring
84 through-hole
86 arrow; flowing-off lubricant
88 surroundings
90 threaded bolt
96 main body of the radial shaft sealing ring
98 web of the radial shaft sealing ring
100 edge portion of the radial shaft sealing ring
102 tensioning element of the radial shaft sealing ring
104 reinforcing profile of the radial shaft sealing ring
106 outer circumferential face of the additional ring
110 first sealing element
112 second sealing element
114 fixing hole
116 screw connection
118 threaded bolt
120 threaded portion
122 nut α first angle
β second angle

The invention claimed is:

1. A roller bearing for a wind turbine comprising:
a first inner ring comprising an axial protrusion;
a second inner ring;
an outer ring arranged coaxially over the first inner ring and the second inner ring;
at least one rolling-element cage;
a first plurality of rolling elements:
arranged in the at least one rolling-element cage in a first rolling-element row between the first inner ring and the outer ring; and
rolling on a first inner ring raceway and a first outer ring raceway;
a second plurality of rolling elements:
arranged in the at least one rolling-element cage in a second rolling element row between the second inner ring and the outer ring; and
rolling on a second inner ring raceway and a second outer ring raceway;
a bearing interior at least partially filled with a lubricant;
an additional ring arranged radially outwardly on the axial protrusion and comprising a base body including:
a rectangular cross-sectional geometry;
an axially inwardly oriented first end face; and
a radially outwardly directed flange that is flush with the axially inwardly oriented first end face;
an axial extension connected to the outer ring and comprising a cylindrical inner sealing face; and
a radial shaft sealing ring installed on the additional ring in a radially outward manner and comprising a radially outwardly directed sealing lip in radial contact with the cylindrical inner sealing face.

2. The roller bearing of claim 1, wherein the additional ring is attached to the axial protrusion by shrinking.

3. The roller bearing of claim 1 further comprising a sealing element arranged between the axial extension and the outer ring.

4. The roller bearing of claim 1 wherein the outer ring and the axial extension comprise respective continuous axial fixing holes for a screw connection.

5. The roller bearing of claim 1 wherein:
the radial shaft sealing ring comprises an annular main body and a tensioning element;
the annular main body comprises a web that is radially movable;
the web transitions into a peripheral edge portion forming a sealing lip; and
the sealing lip receives the tensioning element.

6. The roller bearing of claim 5, further comprising a closure disk attached to the first inner ring, wherein:
the additional ring comprises an outer circumferential surface; and
the annular main body is received on the outer circumferential surface and is axially clamped between the closure disk and the flange.

7. The roller bearing of claim 5, wherein the annular main body, the web and the peripheral edge portion are formed integrally with the sealing lip by an elastomer.

8. A roller bearing comprising:
a first inner ring comprising a first frustoconical raceway;
a closure disk fixed to the first inner ring;
a second inner ring fixed to the first inner ring and comprising a second frustoconical raceway;

an outer ring comprising:
  a third frustoconical raceway facing the first frustoconical raceway; and
  a fourth frustoconical raceway facing the second frustoconical raceway;
a first plurality of rollers arranged to roll between the first frustoconical raceway and the third frustoconical raceway;
a second plurality of rollers arranged to roll between the second frustoconical raceway and the fourth frustoconical raceway;
an additional ring fixed to the first inner ring and including:
  an outer circumferential surface; and
  a radially outwardly pointing flange;
an axial extension fixed to the outer ring and including a cylindrical inner sealing face; and,
a radial shaft sealing ring:
  installed on the outer circumferential surface;
  contacting the cylindrical inner sealing face; and
  comprising an annular main body clamped between the closure disk and the radially outwardly pointing flange.

9. The roller bearing of claim 8 further comprising:
a bearing interior including a boundary at least partially defined by the first inner ring, the first plurality of rollers, the outer ring, the axial extension, the radial shaft sealing ring; and the additional ring; and
a lubricant disposed in the bearing interior.

10. The roller bearing of claim 9 wherein the additional ring comprises a base body with a axial through hole for expelling the lubricant.

11. The roller bearing of claim 8 wherein the radial shaft sealing ring comprises:
an outwardly directed sealing lip that contacts the cylindrical inner sealing face; and
an annular tensioning element for urging the outwardly directed sealing lip into contact with the cylindrical inner sealing face.

12. The roller bearing of claim 11 wherein the radial shaft sealing ring comprises an outwardly directed movable web connecting the annular main body with the outwardly directed sealing lip.

13. The roller bearing of claim 11 wherein the radial shaft sealing ring comprises a reinforcing profile to help fix the annular main body to the outer circumferential surface.

14. The roller bearing of claim 8 further comprising:
a first sealing element for sealing the first inner ring to the second inner ring; and
a second sealing element for sealing the axial extension to the outer ring.

15. The roller bearing of claim 8 further comprising a cage for receiving the first plurality of rollers or the second plurality of rollers.

16. A roller bearing for a wind turbine comprising:
a first inner ring comprising an axial protrusion and an end-face outer face;
a second inner ring;
an outer ring arranged coaxially over the first inner ring and the second inner ring;
at least one rolling-element cage;
a first plurality of rolling elements:
  arranged in the at least one rolling-element cage in a first rolling-element row between the first inner ring and the outer ring; and
  rolling on a first inner ring raceway and a first outer ring raceway;
a second plurality of rolling elements:
  arranged in the at least one rolling-element cage in a second rolling element row between the second inner ring and the outer ring; and
  rolling on a second inner ring raceway and a second outer ring raceway;
a bearing interior at least partially filled with a lubricant;
an additional ring arranged radially outwardly on the axial protrusion and comprising a base body including an axially outwardly directed second end face flush with the end-face outer face;
an axial extension connected to the outer ring and comprising a cylindrical inner sealing face;
a radial shaft sealing ring installed on the additional ring in a radially outward manner and comprising a radially outwardly directed sealing lip in radial contact with the cylindrical inner sealing face; and
a closure disk attached to the end-face outer face.

17. The roller bearing of claim 16 wherein the additional ring and the closure disk comprise respective axial through-holes.

18. The roller bearing of claim 16 wherein the closure disk is connected to the first inner ring and to the additional ring by screw connections.

* * * * *